(12) United States Patent
Blümel et al.

(10) Patent No.: US 7,878,681 B2
(45) Date of Patent: Feb. 1, 2011

(54) ILLUMINATION DEVICE

(75) Inventors: Simon Blümel, Schierling (DE); Hubert Ott, Abbach (DE); Ludwig Plötz, Arnschwang (DE); Mario Wanninger, Regensburg (DE); Günter Kirchberger, Sinzing (DE); Peter Wolff, Donaustauf (DE); Markus Zeiler, Nittendorf (DE)

(73) Assignee: Osram Opto Semiconductor GmbH, Regensburg (DE)

( * ) Notice: Subject to any disclaimer, the term of this patent is extended or adjusted under 35 U.S.C. 154(b) by 409 days.

(21) Appl. No.: 11/814,191

(22) PCT Filed: Jan. 19, 2006

(86) PCT No.: PCT/DE2006/000082

§ 371 (c)(1),
(2), (4) Date: Jan. 7, 2008

(87) PCT Pub. No.: WO2006/076899

PCT Pub. Date: Jul. 27, 2006

(65) Prior Publication Data

US 2008/0111471 A1    May 15, 2008

(30) Foreign Application Priority Data

Jan. 19, 2005  (DE) .................. 10 2005 002 709
Dec. 16, 2005  (DE) .................. 10 2005 060 382
Jan. 17, 2006  (DE) .................. 10 2006 002 275

(51) Int. Cl.
*F12V 9/00*      (2006.01)

(52) U.S. Cl. .................. 362/231; 362/230; 362/97.3

(58) Field of Classification Search ............... 362/231, 362/230, 800, 97.1–97.4, 330, 600–634
See application file for complete search history.

(56) References Cited

U.S. PATENT DOCUMENTS

| 4,907,044 | A  | 3/1990 | Schellhorn et al. |
| 6,066,861 | A  | 5/2000 | Höhn et al. |
| 6,111,272 | A  | 8/2000 | Heinen |
| 6,576,930 | B2 | 6/2003 | Reeh et al. |
| 6,592,780 | B2 | 7/2003 | Höhn et al. |
| 6,598,998 | B2 | 7/2003 | West et al. |
| 6,607,286 | B2 | 8/2003 | West et al. |
| 6,679,621 | B2 | 1/2004 | West et al. |

(Continued)

FOREIGN PATENT DOCUMENTS

DE          8713875          3/1988

(Continued)

OTHER PUBLICATIONS

Examination report issued in corresponding European Application No. 06 705 820.6 on Dec. 11, 2008.

(Continued)

*Primary Examiner*—Bao Q Truong
(74) *Attorney, Agent, or Firm*—Fish & Richardson P.C.

(57) ABSTRACT

Disclosed is an illumination device comprising a radiation-emitting front side and a multiplicity of light sources (R, G, B), wherein said multiplicity of light sources (R, G, B) is divided into light source groups (LG) and the light source groups (LG) are arranged on the grid points of a first regular grid.

16 Claims, 9 Drawing Sheets

U.S. PATENT DOCUMENTS

| | | | |
|---|---|---|---|
| 6,957,901 | B2 | 10/2005 | Schach et al. |
| 7,078,732 | B1 | 7/2006 | Reeh et al. |
| 7,281,816 | B2 | 10/2007 | Suzuki |
| 7,320,531 | B2 | 1/2008 | West et al. |
| 2003/0063062 | A1 | 4/2003 | Tsumura et al. |
| 2003/0161137 | A1 | 8/2003 | Schach et al. |
| 2004/0008524 | A1* | 1/2004 | Lee et al. .................... 362/561 |
| 2004/0218388 | A1 | 11/2004 | Suzuki |
| 2004/0262623 | A1 | 12/2004 | You |
| 2005/0001537 | A1 | 1/2005 | West et al. |
| 2006/0007553 | A1 | 1/2006 | Bogner et al. |
| 2006/0138437 | A1 | 6/2006 | Huang et al. |
| 2006/0180820 | A1 | 8/2006 | Illek et al. |
| 2006/0209538 | A1 | 9/2006 | Chang et al. |
| 2006/0232969 | A1 | 10/2006 | Bogner et al. |
| 2008/0024696 | A1 | 1/2008 | Arai et al. |

FOREIGN PATENT DOCUMENTS

| | | | |
|---|---|---|---|
| DE | 200 07730 | | 9/2000 |
| EP | 0905797 | | 8/1998 |
| EP | 0 921568 | | 6/1999 |
| EP | 1 380876 | | 1/2004 |
| EP | 1 521235 | | 4/2005 |
| EP | 1 594172 | | 11/2005 |
| EP | 1 801 637 | | 6/2007 |
| GB | 2 361581 | | 10/2001 |
| JP | 8-30213 | * | 2/1996 |
| JP | 8030213 | | 2/1996 |
| JP | 11-003051 | | 1/1999 |
| WO | WO 97/50132 | | 12/1997 |
| WO | WO 98/12757 | | 3/1998 |
| WO | WO 01/83264 | | 11/2001 |
| WO | WO 02/13281 | | 2/2002 |
| WO | WO 02/079862 | | 10/2002 |
| WO | WO 2004/031844 | | 4/2004 |
| WO | WO 2004/032235 | | 4/2004 |
| WO | WO 2006/040937 | | 4/2006 |

OTHER PUBLICATIONS

Cossu, Alessandro, "Examination Report", European Application No. 06 828 696.2, Apr. 16, 2009 (6 pages).

Plötz Ludvig and Stich Andreas, "LED Display Backlignting—Large Screen and TV Application using Golden DRAGON® ARGUS®", *OSRAM, Opto Semiconductors*, pp. 1-8, 2005.

International Search Report, PCT/PCT/DE2006/000082, Dec. 14, 2006.

"Examination Report", European Patent Office, Application No. 06 828 696.2, Aug. 11, 2009 (5 pages).

* cited by examiner

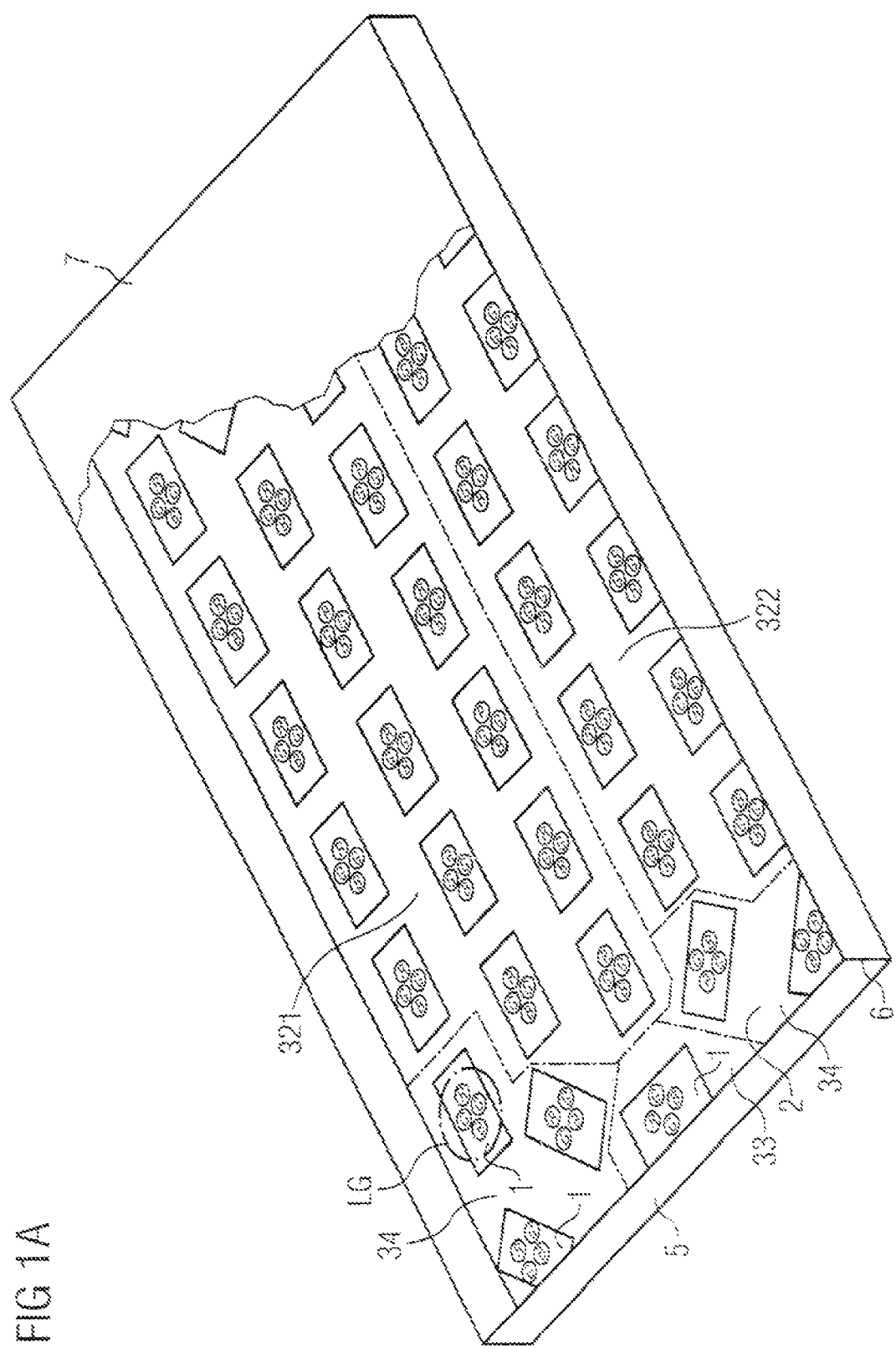

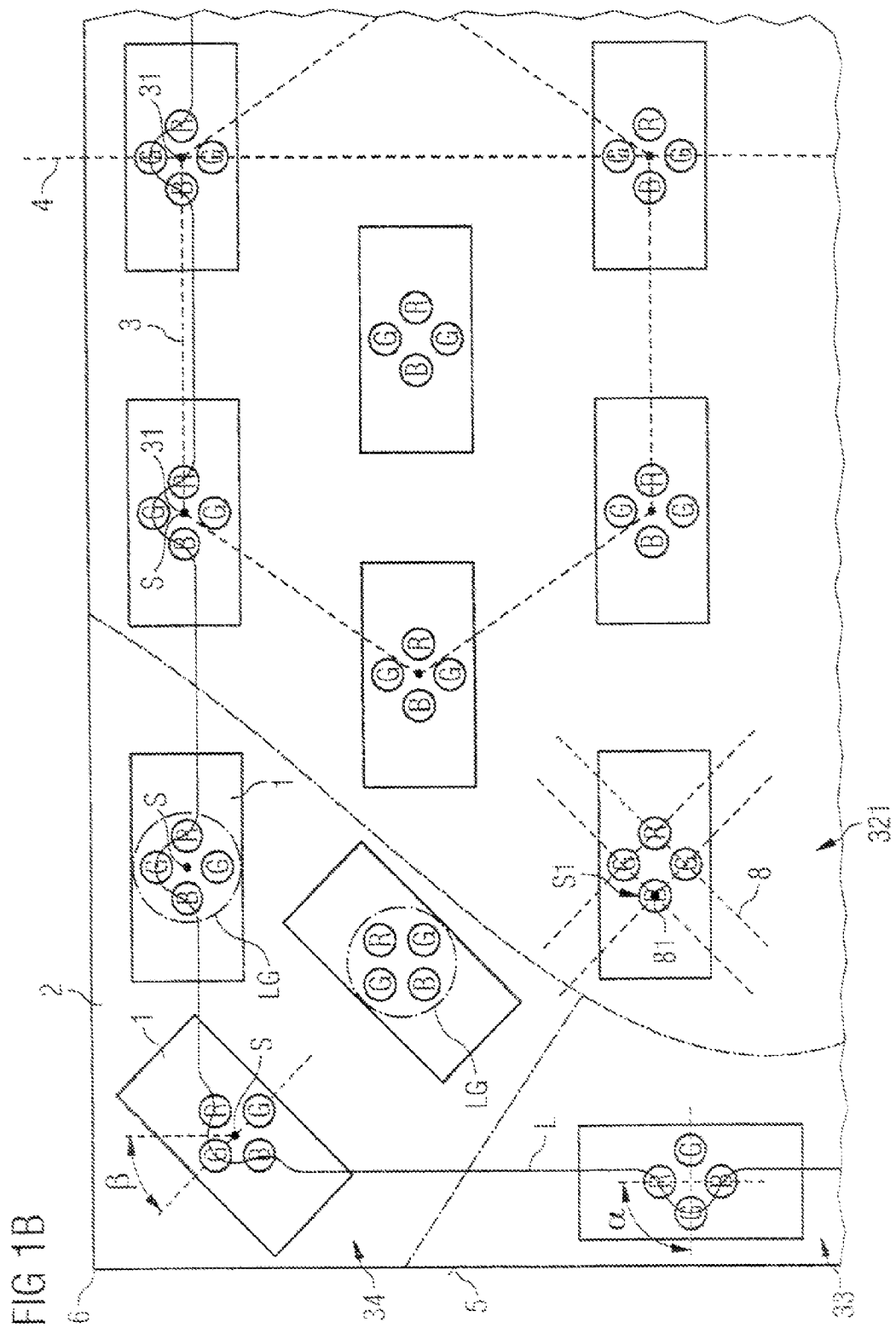

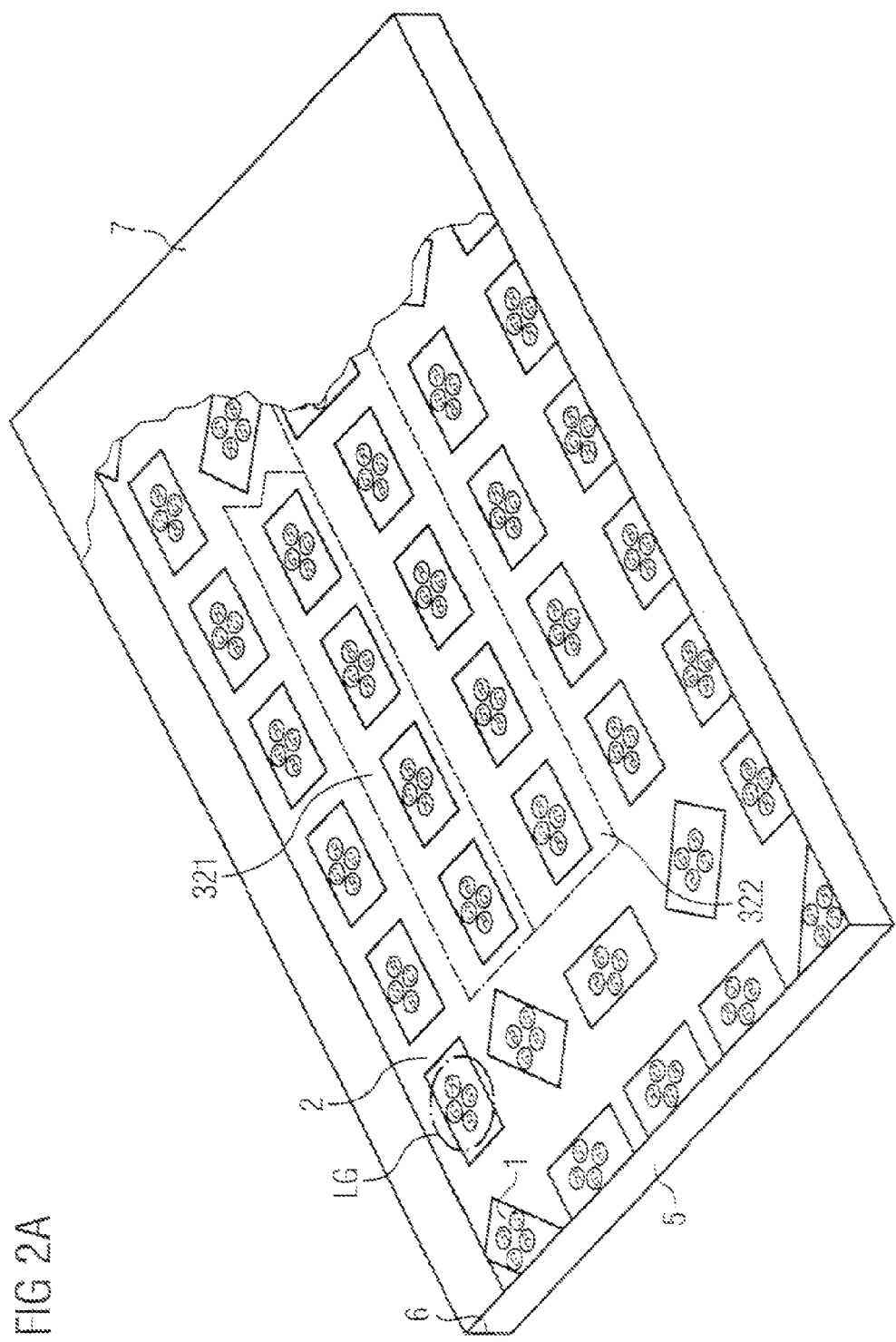

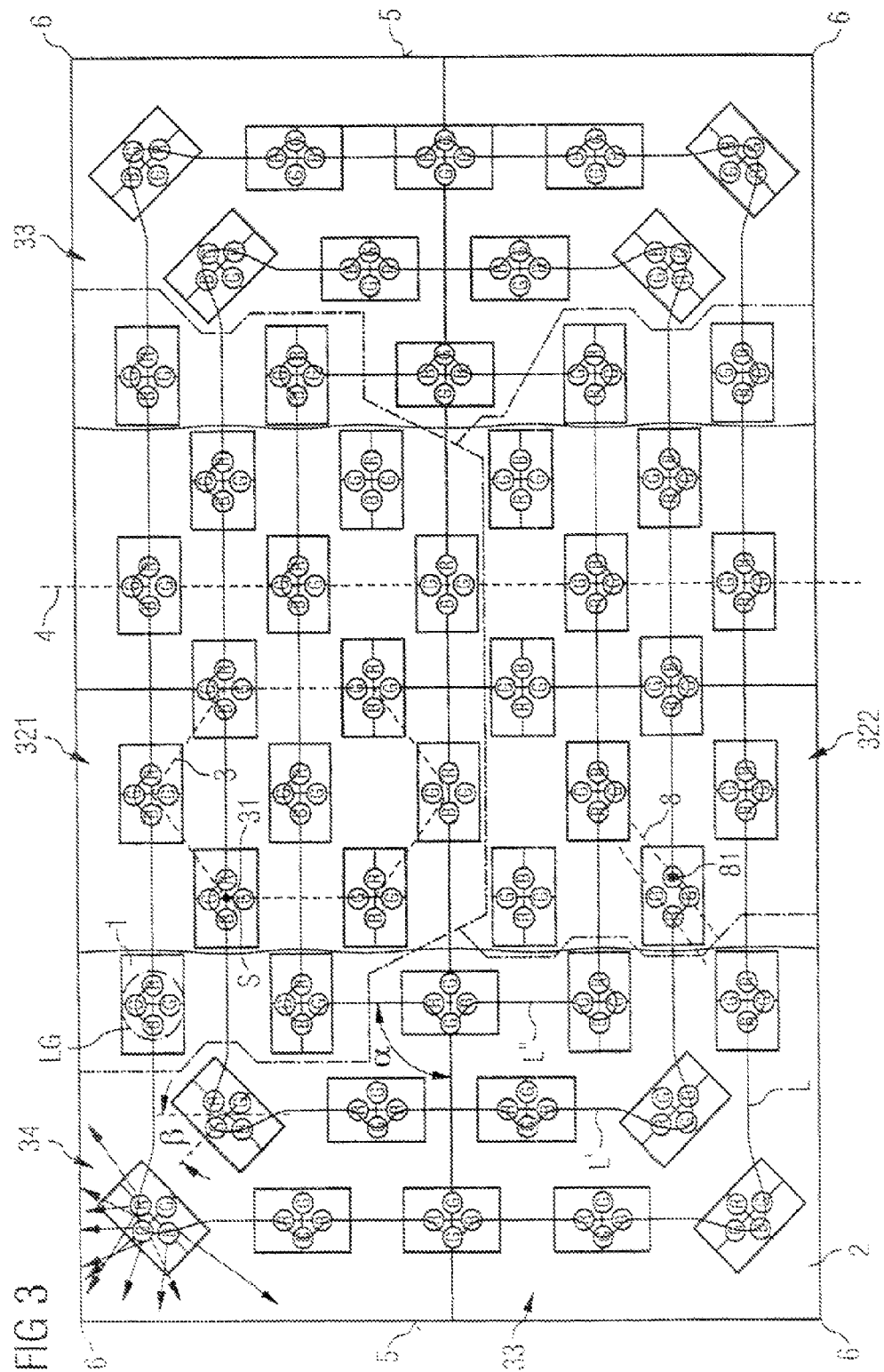

FIG 7
a)
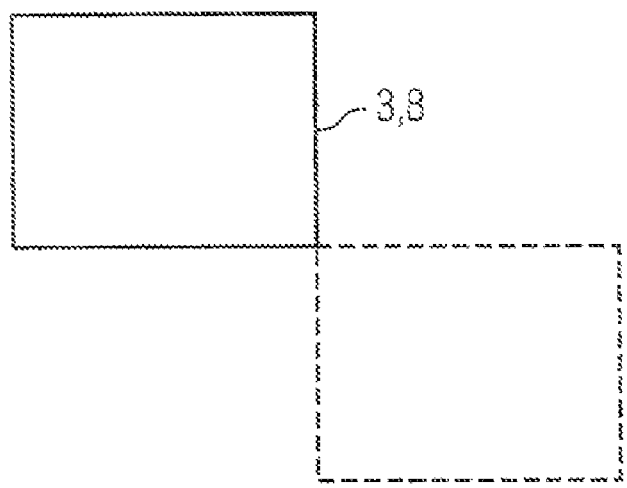
b)
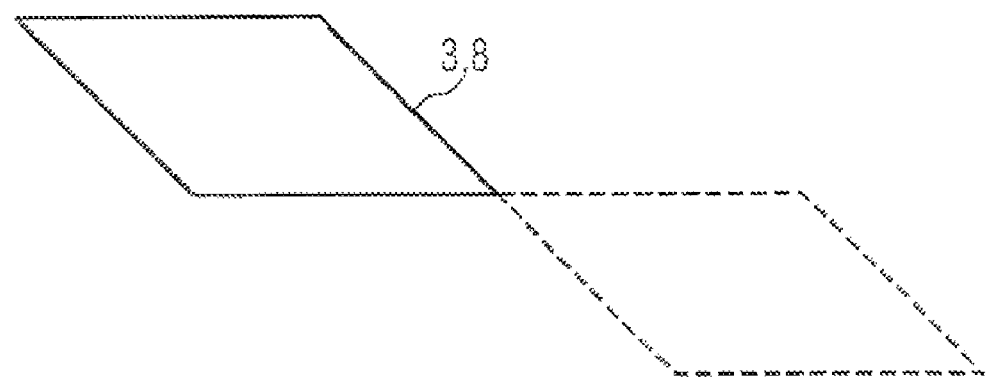
c)
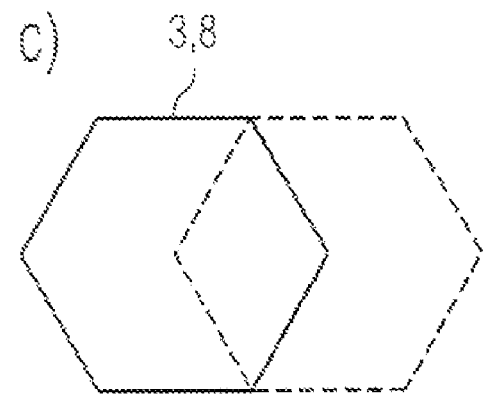

ILLUMINATION DEVICE

CROSS-REFERENCE TO RELATED APPLICATIONS

This application is the National Stage of international Application No. PCT/DE2006/000082, filed on Jan. 19, 2006, which claims the priority to German Patent Applications Ser. No. 10 2005002709.1, filed on Jan. 19, 2005, Ser. No. 10 2005060382.3, filed on Dec. 16, 2005 and Ser. No. 10 2006002275.0, filed on Jan. 17, 2006. The contents of all applications are hereby incorporated by reference in their entireties.

FIELD OF THE INVENTION

The invention relates to an illumination device having a radiation-emitting front side and a multiplicity of light sources divided into light source groups.

BACKGROUND

An illumination device for the backlighting of displays is described for example in the document WO 2004/031844 A1. To generate light that creates a white color impression, that illumination device comprises individual colored light sources arranged such that mixed-color light is radiated from the front side of the illumination device. In addition, in the illumination device according to document WO 2004/031844 A1, the primary light sources are arranged such that their main radiation direction is parallel to the radiation direction of the illumination device, and the different-colored light sources therefore directly irradiate the surface that is to be backlit. However, with illumination devices of this design, it is particularly difficult to obtain a radiation characteristic that is uniform in terms of color and intensity and at the same time devise a flat construction.

SUMMARY

One object of the invention is to specify an illumination device that can be particularly thinly configured and simultaneously has the most uniform possible radiation characteristic.

An illumination device having a radiation-emitting front side comprises in particular a multiplicity of light sources divided into light source groups, said light source groups being arranged on the grid points of a first regular grid.

The light source groups axe preferably similarly arranged on the grid points of the first regular gild. Particularly preferably, the light source groups are arranged with their focal points on the grid points of the first grid, i.e., the focal points of the light source groups are congruent with the grid points. In the present context, the term "focal point of the light source group" means the geometric focal point of a light source group.

The radii of the circumcircles of the light source groups are preferably much smaller than the distance between adjacent grid points or the length of at least one grid vector of the first grid. The term "circumcircle of a light source group" denotes herein the smallest possible circle that completely surrounds the light sources of a light source group. The ratio of the radius of the circumcircle of a light source group to the distance between adjacent grid, points or to the length of at least one grid vector of the first grid is preferably between 1:2 and 1:100, limits included.

Selecting the distance ratios in this manner creates the impression, on looking at the grid arrangement, of punctiform light sources in a regular grid arrangement. When different-colored light sources are present in one light source group, virtually uniform color mixing of the light from a light source group is obtained in this way. If the distance between the light source groups and the radiation-emitting front side is also suitably selected, then virtually uniform backlighting is produced by broadening the cone of light from the individual light source groups. A suitably selected distance between the light source groups and the radiation-emitting front side of the illumination device is, for example, between 10 mm and 100 mm. Particularly preferably, the distance between the light source groups and the radiation-emitting front side of the illumination device is between 20 mm and 50 mm.

The light sources of a light source group are preferably all disposed on a common carrier. As a general rule, this makes it possible to simplify process flows during production. The production and assembly of the light sources can thus be simplified, since modules containing-one light source group can each be fabricated on a carrier in a first production step and subsequently built up into an illumination device, for example by mounting them on an additional carrier corresponding to the provided first regular grid.

Alternatively, a plurality of light source groups can be mounted collectively on a carrier for example in the form of a tape. This reduces the number of parts that must be mounted during the production of the illumination device. However, it also reduces the degrees of freedom in arranging the individual light source groups.

A metal-core circuit board, for example, can be used as the carrier for one or more light source groups. A metal-core circuit board has the advantage that the conductive traces and contact points necessary for electrical contacting can easily be integrated onto it.

The first regular grid has, for example, a grid structure that is configured as hexagonal, rhombic, rectangular, square or in the manner of a parallelogram. Particularly preferably, a hexagonal grid structure is used. This grid structure can be mapped, onto itself by rotating it 60° about an axis of rotation that is perpendicular to the plane in which the hexagonal grid structure is formed. It therefore has very high symmetry and is advantageously suitably for creating a particularly uniform radiation characteristic for the illumination device.

In a farther particularly preferred embodiment, the light sources of a light source group are also each arranged on the respective grid points of a second regular grid. Here, the second regular grid also has, for example, a grid structure that is configured as hexagonal, rhombic, rectangular, square or in the manner of a parallelogram. Again, a hexagonal, grid structure is particularly preferably used because of its high symmetry.

In this embodiment, the light sources are preferably arranged with the respective focal points of their bases on the grid points of the second lattice. The term "focal point of the light source" means herein the geometrical focal point of the light sources. Furthermore, it is also possible for the optical axis of each light source to pass through the respective associated grid point of the second grid.

In a particularly preferred embodiment, the first regular grid and the second regular grid have the same grid structure, particularly preferably a hexagonal grid structure in each ease. In this way, virtually uniform illuminance of a respective color can be obtained in the area to be illuminated.

If similar light source groups of identical composition are used, then respective adjacent light sources of the same color in different light source groups are the same distance from each another if both the first and the second regular grids have a hexagonal structure. For these reasons, a first regular grid and a second regular grid having a hexagonal grid structure advantageously lead to the best possible blending of the light from the light sources, and in particular to improved uniformity of the radiation characteristic of the illumination device with respect to color and intensity.

The illumination device preferably comprises light source groups of identical, composition and identical orientation. Very even lighting of the to-be-illuminated surface can thus be achieved with different colors.

In a preferred embodiment, a light source group comprises light sources of at least two different colors, since mixed-color light can be generated in this way.

The illumination device preferably emits, from its front side, mixed-color light whose color locus is in the white region of the CIE standard chromaticity diagram, illumination devices that emit light with a color locus in the white region of the CIE standard chromaticity diagram advantageously have industrial applications in many fields, for example in the backlighting of displays such as LCD displays.

The light source group preferably comprises at least one red, at least one green and at least one blue light source, particularly preferably a single red, two green and a single blue light source, or a multiple of the respective number, i.e., two reds, four greens and two blues; three reds, six greens and three blues; etc. In particular, a combination of red/green/blue in the ratio 1/2/1 in a light source group permits the technically simple production of an illumination device that creates an attractive white color impression. It is also possible to obtain a ratio of 0.5/1/0.5 with one red, one green and one blue light source, for example by adjusting the current that is supplied to the light sources. Hence, the number of light sources need not necessarily be a whole multiple of the ratio 1/2/1, but rather, the illuminance of the individual light sources can be adjusted to create a 1/2/1 ratio.

In addition, a light source group can also include one or more white-light sources. Such white-light sources make it possible, for example, to vary the basic brightness of the illumination device.

In a practical configuration of the invention, not all the light source groups have the same composition in terms of different-colored light sources. Individual light source groups can, for example, contain additional light sources, for example white-light sources as mentioned above, but also light sources of another color. In this way, for example, specific regions of the illumination device can be made to emit light of another color, another hue and/or another brightness. Such an illumination device can, for example, be used for general lighting or mood, lighting.

Furthermore, the brightness of regions of die illumination device that look darker than the rest, for example because they are shaded by other elements of the illumination device, can be increased in a specifically targeted manner.

It should be noted at this point that light sources of other colors besides red, green, blue and white can be used in the illumination device. Particularly in general lighting applications, it may be useful to employ light sources of other colors as well, depending on the desired color for the radiated light. To produce light sources of any desired color, for example conversion materials can be incorporated into the light sources or other elements of the illumination device.

In an illumination device comprising light source groups of different composition, light source groups of the same composition are preferably arranged symmetrically on the grid points of the first regular grid such that the light source groups of one composition all form a kind of regular overgrid. In this fashion, the symmetry of the first regular grid can advantageously be utilized to produce a uniform radiation characteristic and, further, to vary the brightness and color impression of the light radiated from the front side of the illumination device.

In the illumination device according to the invention, the light sources are preferably arranged such that their optical axes are disposed substantially parallel to the radiation direction of the illumination device. The illumination device according to the present application is therefore preferably a direct illumination device, whose light sources directly irradiate the area to be illuminated. Such a direct illumination device can be implemented as particularly efficient and lightweight in comparison to an illumination device comprising one or more light guides in which the light from the light sources is coupled in laterally.

The light sources of the illumination device are preferably disposed at a distance of between 10 mm and 100 mm (limits included) from die radiation-emitting front side of the illumination device. Even with these very small distances, the illumination device advantageously provides high uniformity of intensity and color for the light radiated from its front side.

Advantageously, as a rule, the illuminance obtained on the front side of the illumination device has no sharp edges perceptible by the viewer, stemming for example from the beam cones of individual light sources or light source groups.

According to a further embodiment of the illumination device, not all the grid points of the first grid are occupied by light source groups, but, for example, only every second or third one. In this way, it is possible to make use of the symmetry of the grid arrangement, with its above-described advantages, and simultaneously to vary the overall brightness of the illumination device. It Is also conceivable for only individual subregions of the illumination device not to be completely occupied by light source groups on all grid points, for example if it is intended for the brightness distribution on the front side of the illumination device to vary laterally.

Organic light-emitting diodes (OLEDs), inorganic semiconductor light-emitting diodes (LEDs) or laser diodes (LDs) are preferably used as light sources in the illumination device. Such light sources generally have the advantages of high efficiency, low energy consumption and small construction.

In a further embodiment of the illumination device, the light source groups are oriented, similarly to one another in an inner region of the first regular grid.

Particularly preferably, light source groups in the edge regions of the first grid are arranged in the plane of that grid such that they are rotated by a given angle relative to the light source groups particularly in the inner region of the first grid. This means that the light sources of these rotated light source groups are arranged differently relative to their associated grid point than are the light sources of the light source groups in the inner region. Particularly preferably, light source groups of the edge region are arranged such that they are rotated 90° with respect to the light source groups of the inner region.

In a further, particularly preferred embodiment, light source groups located in corner regions of the first grid that are adjacent to comers of the illumination device are also arranged in the plane of that grid such that they are rotated by a given angle relative to the light source groups particularly in the inner region of the grid. These rotated light source groups of the corner regions are normally arranged such that they are rotated by a different angle relative to the light source groups of the inner region than are the light source groups of the edge region. Particularly preferably, light source groups of the corner regions are rotated 45° relative to the light source groups of the inner region.

The light source groups are preferably arranged such that a periodic sequence of different-colored light sources is obtained by tracking across the light source groups closest to the edge. The lighting in edge regions of the illumination device is homogenized in this way, particularly with respect to color.

Further advantages and advantageous embodiments and improvements of the invention, will emerge from the exemplary embodiments described in more detail hereinafter in conjunction with FIGS. 1A, 1B, 2A, 2B, 3 to 5, 6A to 6E and 7A to 7C.

BRIEF DESCRIPTION OF THE DRAWINGS

FIG. 1A is a perspective, schematic representation of an illumination device according to a first exemplary embodiment.

FIG. 1B is a schematic plan view of a detail of the upper left region of the illumination device according to FIG. 1A, FIG. 2A is a perspective, schematic representation of an illumination device according to a second exemplary embodiment, FIG. 3 is a schematic plan view of an illumination device according to a third exemplary embodiment, FIGS. 7A to 7C are schematic representations of grid structures according to three different embodiments.

DETAILED DESCRIPTION

Figure 2B:
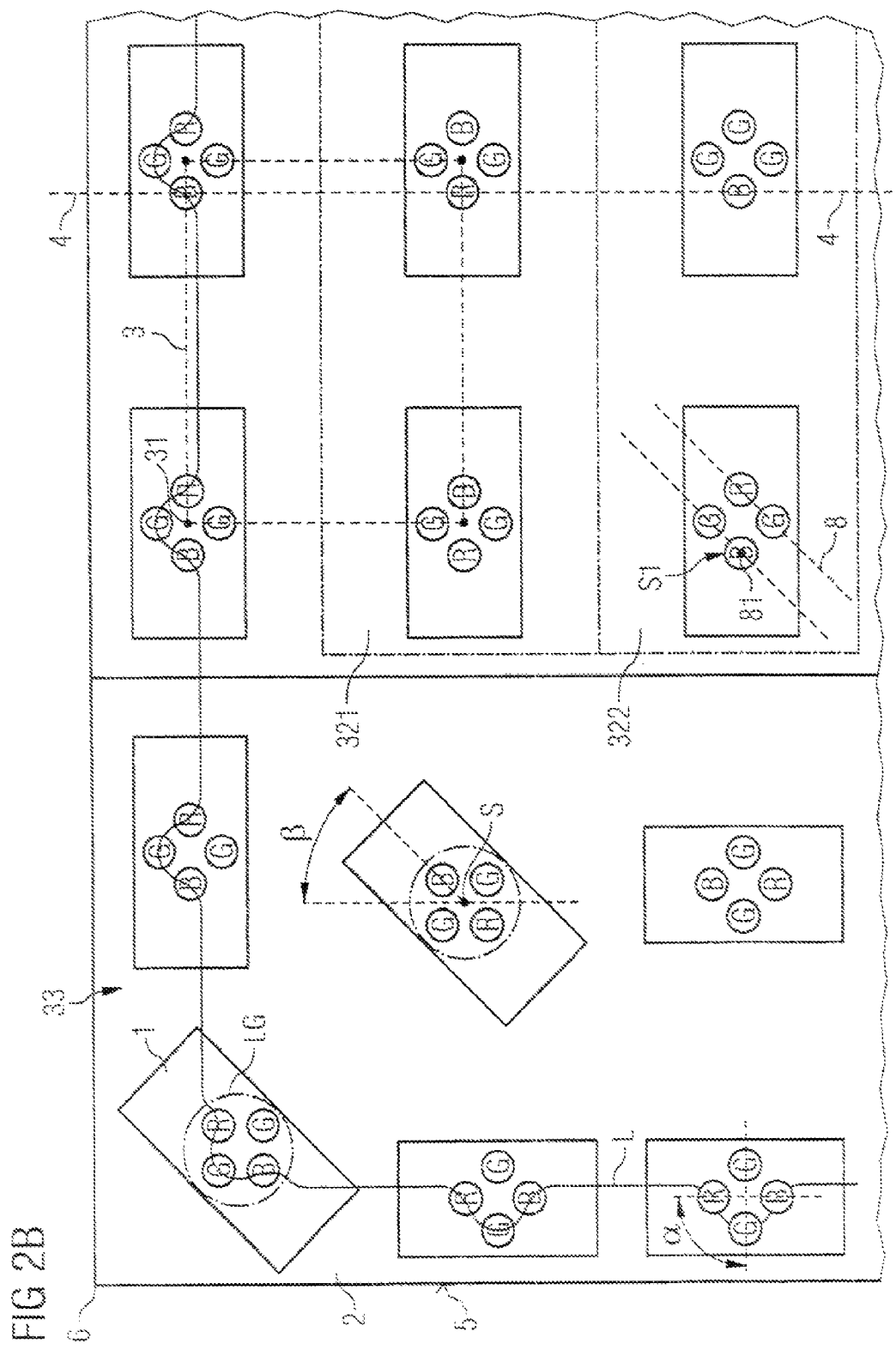
FIG. 2B is a schematic plan view of a detail of the upper left region of the illumination device according to FIG. 2A.

In the exemplary embodiments and figures, like or like-acting elements are provided with the same respective reference numerals. The illustrated elements and their size relationships are basically not to be considered true to scale, but rather, individual elements, such as for example light sources or light source groups and grid structures, may be depicted as exaggeratedly large for the sake of better understanding and/or better visualization.

The illumination device according to the exemplary embodiment of FIGS. 1A and 1B comprises a multiplicity of light sources. The light sources used in the present case are light-emitting diodes ("LEDs" for short). However, other light sources can also be used, for example organic light-emitting diodes or laser diodes.

The multiplicity of LEDs comprises LEDs that emit red light (hereinafter "red LEDs") LEDs that emit green light (hereinafter "green LEDs"), and LEDs that emit blue light (hereinafter "blue LEDs"). Red LEDs, green LEDs and blue LEDs are provided hereinafter with the reference characters R, G and B, respectively.

The multiplicity of red LEDs R, green LEDs G and blue LEDs B is divided Into light source groups LG, with each light source group containing one red LED R, two green LEDs G and one blue LED B. Each light source group LG is mounted on a separate carrier 1, each of which is disposed on an additional, larger carrier 2, such as for example a display back wall (see FIG. 1A).

The light source groups LG are arranged on the additional carrier 2 on the grid points of a first regular grid 3, which in the present ease has a hexagonal grid structure. In addition, each light source group LG is arranged with its focal points S on the respective grid points 31 of the first regular grid 3, as illustrated for example in FIG. 1B.

In addition, the LEDs R, G, B of a light source group LG are arranged on the grid points of a second regular grid 8, which in the present ease also has a hexagonal grid structure.

In a first inner region 321 and a second inner region 322 of the first regular grid 3, light source groups LG are each arranged such that their light sources have the same orientation relative to one another, that is, the light sources LG have the same position relative to their respective grid points. As a result, for example a plurality of LEDs of the same color R, G, B are arranged on a common straight line 4 in one of inner regions 321, 322. As a further result, light sources LG of the same color are arranged on the grid points of a common regular grid that has the same grid constants as the first regular grid and is arranged offset therefrom.

In an edge region 33 and a corner region 34 of the first regular grid 3 that are adjacent a side face 5 of the illumination device, the light source groups LG are arranged rotated by a given angle α, β relative to the light source groups LG of the first inner region 321.

Thus, two light source groups LG in each corner region 34 of the grid are each rotated relative to the light source groups LG of first inner region 321 by an angle β=45°, this rotation being counterclockwise in the corner region 34 adjacent the upper right [sic] corner of the illumination device illustrated in FIG. 1B. In the other corner regions 34 of the first regular grid, one of which can be seen in FIG. 1A, the light source groups are also rotated by an angle β=45° relative to the light source groups of first inner region 321, but such that the rotation is performed in each case relative to the corners of the illumination device.

The light source group LG located in edge region 33 and positioned between these two light source groups LG that are rotated 45° is additionally rotated counterclockwise relative to the light source groups LG of first inner region 321 by an angle α=90°.

The rotated positioning of the light source groups LG is such, in each case, that one LED of a color R, G, B from each light source group LG is aimed directly at the respective side face 5 of the illumination device and illuminates them substantially unhindered, with no shading by other light sources R, G, B.

Due to the rotated positioning of the light source groups in the edge regions 33 and the corner regions 34, in the illumination device of FIG. 1A all the edge light source groups LG are positioned such that in each case a red R, a green G and a blue B LED are disposed adjacent the side faces $5^1$ of the illumination device. The light source groups LG thus are arranged such that a periodic sequence of different-colored light sources is obtained by tracking, along line L, across the light sources closest to the edge.

This advantageously improves the uniformity of the illumination from the edge regions 33 and the corner regions 34 of the illumination device.

The light-emitting front side 7 of the illumination device is formed, for example, by a radiation-transparent plate, such as for example a milk-white plate or a diffuser plate, made for example of synthetic material. A transparent plate that is structured or printed to scatter the light from the light sources can also be used as the light-emitting front side 7.

In contrast to the illumination device according to the exemplary embodiment of FIGS. 1A and 1B, the light source groups LG in the exemplary embodiment according to FIGS. 2A and 2B are arranged on the grid points of a first regular grid 3 having a rectangular grid structure. As in the exemplary embodiment according to FIGS. 1A and 1B, a light source group LG is composed of one red R, two green G and one blue B LED. In addition, in the exemplary embodiment according to FIGS. 2A and 2B, as in the exemplary embodiment according to FIGS. 1A and 1B, the light source groups LG are arranged on the grid points 81 of a second regular grid 8 having a hexagonal grid-structure, although here the center points or focal points S1 of the bases of the LEDs R, G, B each come to lie on a grid point 81 of the second regular grid 8.

Also in the illumination device of FIGS. 2A and 2B, the light source groups LG of a first inner region 321 of the first regular grid 8 are arranged such that they have the same orientation relative to their associated grid points, and plural LEDs R, G, B of one color in different light source groups LG can be connected to each other by common straight lines 4.

In addition, also in the illumination device according to FIGS. 2A and 2B, light source groups LG in edge regions 33 and corner regions 34 of the illumination device are positioned rotated by an angle α or β, respectively, relative to the light source groups LG of first inner region 321. The light source groups LG in corner region 34 of the first regular grid 3, which can be seen in FIG. 2B, are oriented rotated counterclockwise by an angle β=45° relative to the light source groups LG of first inner region 321, whereas the light source group[s] LG of FIG. 2B located in edge region 33 and aimed directly at side face 5 of the illumination device are rotated counterclockwise by an angle α=90° relative to the light source groups LG of first inner region 321. A light, source group LG disposed immediately adjacent such an edge light source group LG is further rotated clockwise by an angle α=90° relative to the light source groups LG of first inner region 321.

Also in the exemplary embodiment according to FIGS. 2A and 2B, the light scarce groups LG immediately adjacent the edge of the illumination device are arranged such that a periodic sequence of different-colored light sources is obtained by tracking, along line L, across the light source groups LG closest to the edge.

As illustrated in FIG. 2A, the light source groups in a second inner region 322 are arranged rotated 180° relative to the light source groups of first inner region 321. This arrangement leads to particularly uniform illumination when combined with the present rectangular grid structure of the first regular grid.

In the exemplary embodiment according to FIG. 3, as in the two exemplary embodiments according to FIGS. 1A and 1B and FIGS. 2A and 2B, the light source groups LG are also arranged in a first hexagonal grid 3 and the light sources R, G, B of a light source group LG are also arranged cm the grid points 81 of a second, regular grid 8 having a hexagonal grid structure.

In a first inner region 321 and a second inner region 322 of the first regular grid 3, the light source groups LG are again arranged in the same orientation relative to one another, whereas light source groups LG located in the edge regions 33 and disposed adjacent to respective side faces 5 of the illumination device are positioned rotated by an angle α relative to the light source groups LG of the first inner region 321. Light sources in the corner regions 34 are also arranged rotated by a further angle β relative to the light source groups LG of first inner region 321.

Thus, two light source groups LG in each corner region 34 are rotated by an angle β=45° relative to the light source groups LG of the first inner region 321 of the first regular grid 3.

The light source groups LG located in edge region 33, which is aimed at the side faces 5 and which in the present case is separated from the light source groups LG rotated by an angle β=45° and located in the corner regions 34, are additionally arranged counterclockwise by an angle α=90° relative to the light source groups LG in the first inner region 321 of the first regular grid 3. In this way, the outermost light source groups LG, which are arranged immediately adjacent the side faces 5, are each positioned such that the light of any color from the source group LG illuminates the edge with the least possible shading. In a second inner region 321 of the first regular grid, the light source groups are arranged rotated 180° relative to the light source groups of first inner region 321. Rotating the light source groups in the individual regions of the first regular grid in the illumination device of FIG. 3 advantageously has the effect that not only can the light sources immediately adjacent the edge be connected by a line L, with the different-colored light sources exhibiting a periodic sequence, but the rest of the light sources, located on lines L', L", which extend, offset from line L, along the edge of the illumination device, also exhibit a periodic sequence of colors. The arrangement of the LEDs R, G, B according to FIG. 3 advantageously yields the most uniform possible radiation characteristic for the entire front side 7 of the illumination device. In the present case, the uniformity of the illuminance on the front side is advantageously greater than 85%. This means that the ratio between the minimum luminance and the maximum luminance is more than 0.85. The minimum and the maximum luminance of the front side. 7 are normally determined on the basis of plural measurements of the light density averaged over subareas of the front side 7 having an area of a few square millimeters apiece.

Figure 4:
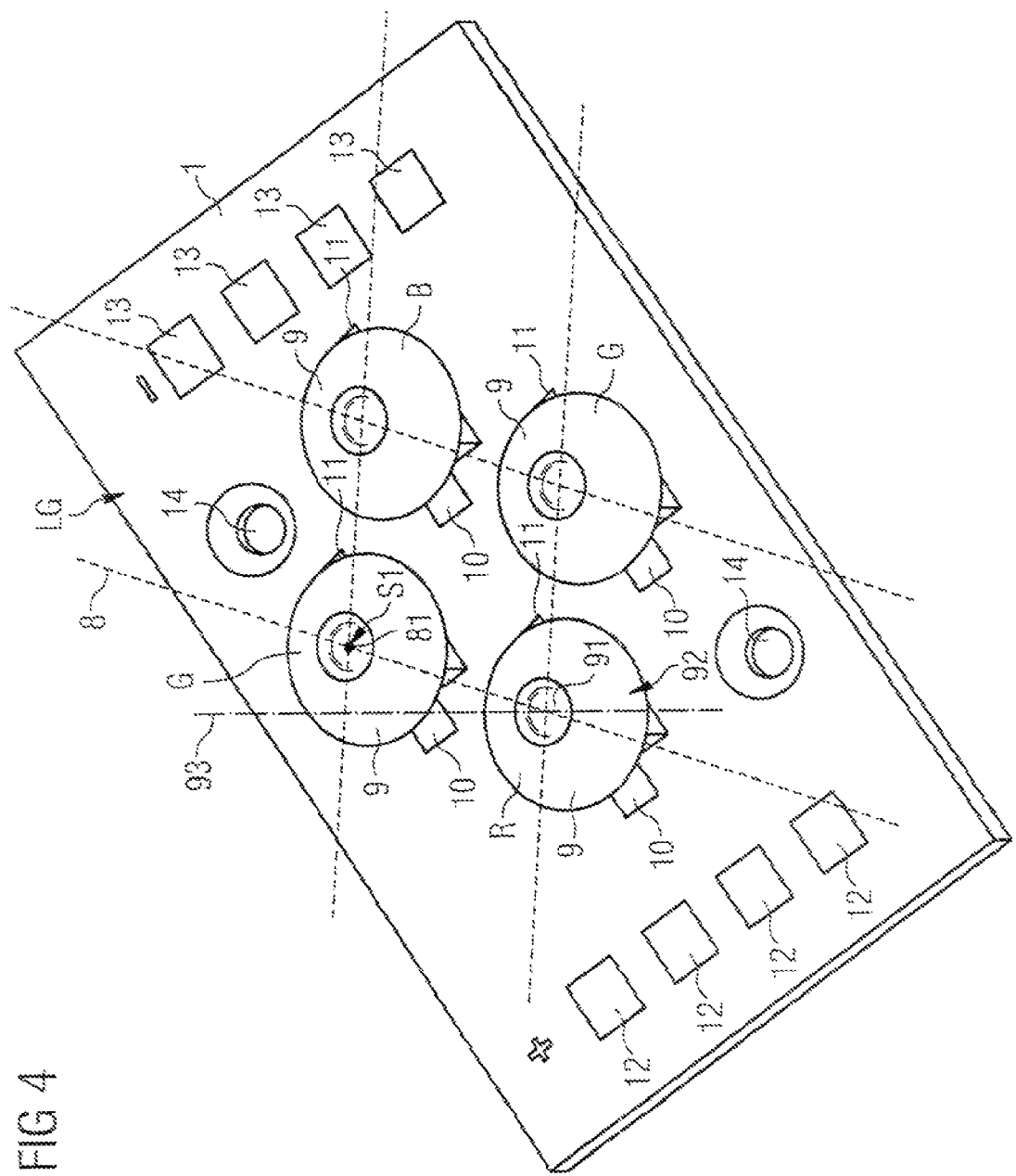
FIG. 4 is a perspective, schematic representation of a light source group according to a fourth exemplary embodiment.

Illustrated in closer detail in FIG. 4, by way of example, is a light source group LG of the kind used in the illumination devices of FIGS. 1A and 1B, 2A and 2B and 3. This comprises two green LEDs G, one red LED R and one blue LED B. The light sources in this case are LEDs that include a lens 9 for beam shaping. This lens 9 has a concavely curved subregion 91, completely surrounded by a convexly curved subregion 92. In addition, the surface of file lens 9 is configured as rotationally symmetrical with respect to its optical axis 93. Furthermore, the LEDs R, G, B comprise a radiation-emitting LED chip (not shown in the figure), which is preferably arranged centered on the optical axis 93 of the lens 9. The lens 9 is suitable for shaping the radiation characteristic of a light-emitting diode chip such that the LED very uniformly illuminates an area remote from the lens 9. The LEDs R, G, B of the light source group LG according to FIG. 4 are therefore particularly suitable for an illumination device that is intended to have the most uniform possible radiation characteristic.

The LEDs R, G, B of the light-emitting diode group LG according to FIG. 4 axe mounted on a carrier 1, a metal-core circuit board in the present case, for example by selective soldering or by means of an electrically conductive glue. Arranged laterally of each LED R, G, B are two contact regions 10, 11, which are electrically conductively connected by conductive traces (not shown in the figure) to contact regions 12, 13 on the circuit board 1. These contact regions 12, 13 of the circuit board 1 are arranged in lateral edge regions of the carrier 1, with the contact regions 12 on the one side of the circuit board 1 serving as anodes (denoted by + in the figure) and the contact regions 13 on the other side of the carrier 1 serving as cathodes (denoted by − in the figure).

In addition, the carrier 1 of the light source group LG comprises two bores 14, which are provided to receive dowel pins for mounting the light-emitting diode module according to FIG. 4 on an additional carrier 2.

The LEDs R, G, B of me light source group LG according to FIG. 4 are arranged on the grid points 81 of a second regular grid 8 having a hexagonal grid structure. In the present case, the LEDs R, G, B are each arranged on a grid point 81 of the second regular grid 8 such that the optical axes of the lens and thus the optical axes of the LEDs pass through the grid points of the second grid. Since, owing to the rotational symmetry of the present LEDs, the optical axis of each LED also passes through the geometric focal point of its base, the LEDs in the exemplary embodiment of FIG. 4 are positioned with their focal points on the grid points of the second regular grid.

Figure 5:
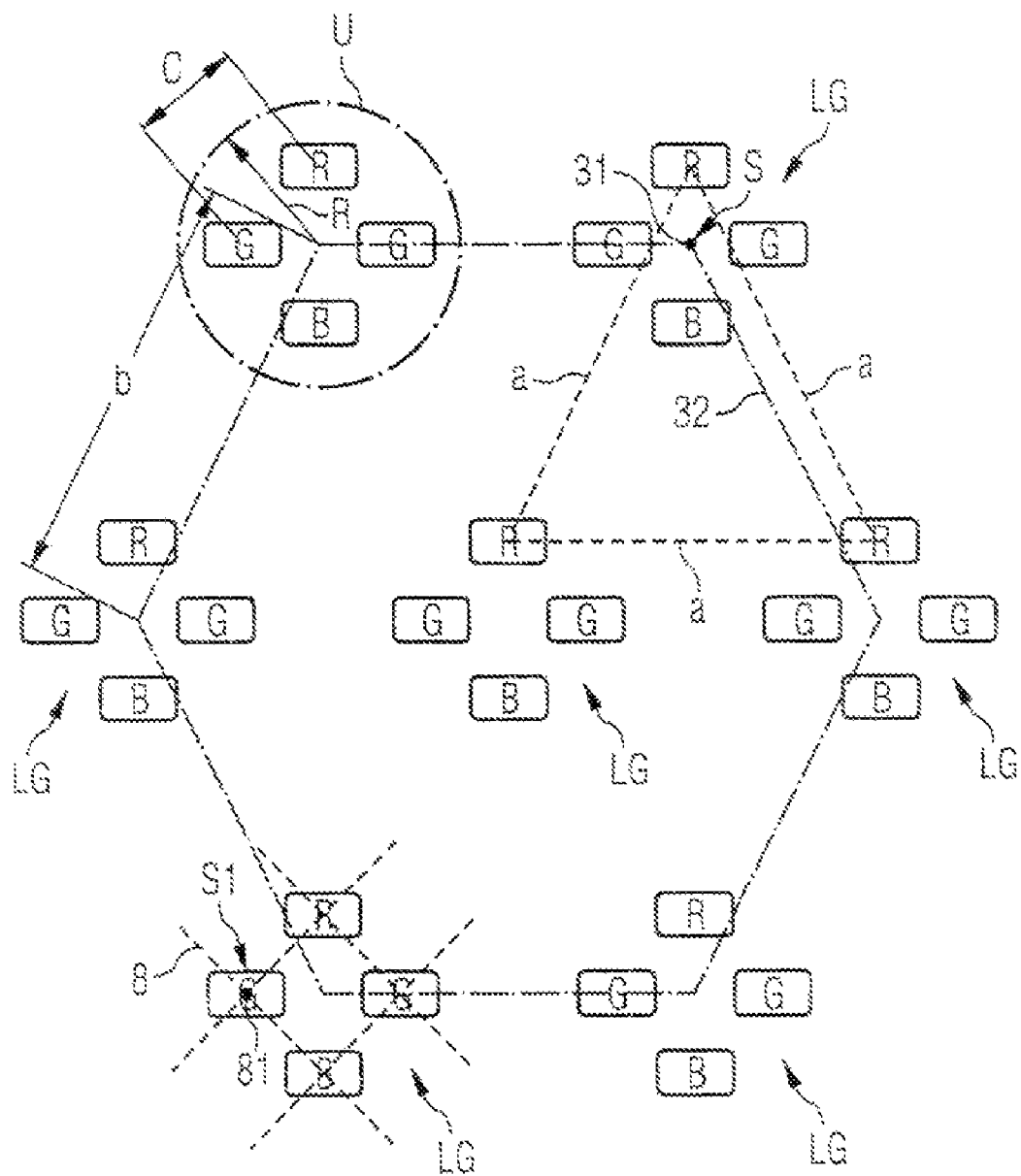
FIG. 5 is a schematic representation of an arrangement of light source groups on the grid points of a first regular grid according to a fifth, exemplary embodiment.

FIG. 5 shows a further exemplary embodiment of a first regular grid 3 having a hexagonal grid structure. A respective light source group LG is arranged on each grid point 31 of the hexagonal grid structure, with the focal point S of the light source group LG coming to lie on a grid point 81.

The light source groups LG according to FIG. 5 again comprise one red light source R, two green light sources G and one blue light source B. These are arranged on the grid points 81 of a second regular grid 8, which, in the present case, like the first regular grid 3, has a hexagonal grid structure. Here again, the focal points S1 of the light sources R, G, B come to lie on the grid points 81 of the second regular grid 8. In addition, the light source groups LG have the same orientation relative to one another. An arrangement according to FIG. 5 is therefore suitable for use, for example, in inner regions 321, 322 of an illumination device of the kind depicted in FIGS. 1A and 1B, 2A and 2B and 3.

Since both the first regular grid 3 and the second regular grid 8 have a hexagonal grid structure, respective light sources R, G, B of respective immediately adjacent light source groups LG of one color are the same distance a from each other.

It will be noted here that the distances between grid points 31 of the first grid 3 in the figures are shown schematically shortened to facilitate visualization. Nevertheless, the grid structures of the first and second grids 3, 8 are preferably configured such that the distances between individual light source groups LG are much greater than the distances between the individual light sources R, G, B of a light source group LG. This is expressed, for example, by the fact that the respective circumcircle U of a light source group LG has a much smaller radius R than the distance b between immediately adjacent grid points 31 of the first regular grid 3. Thus, in the exemplary embodiment of FIG. 5, the distance b between two immediately adjacent light source groups LG is between 30 mm and 100 mm, whereas the distance c between individual light sources R, G, B of a light source group LG is between 10 mm and 20 mm and the radius R of the circumcircle U of a light source group LG has a value of between 30 mm and 40 mm. The distance between the light sources and the radiation-emitting front side (not shown in the figure) is 40 mm and 50 mm in the present case.

Figure 6:
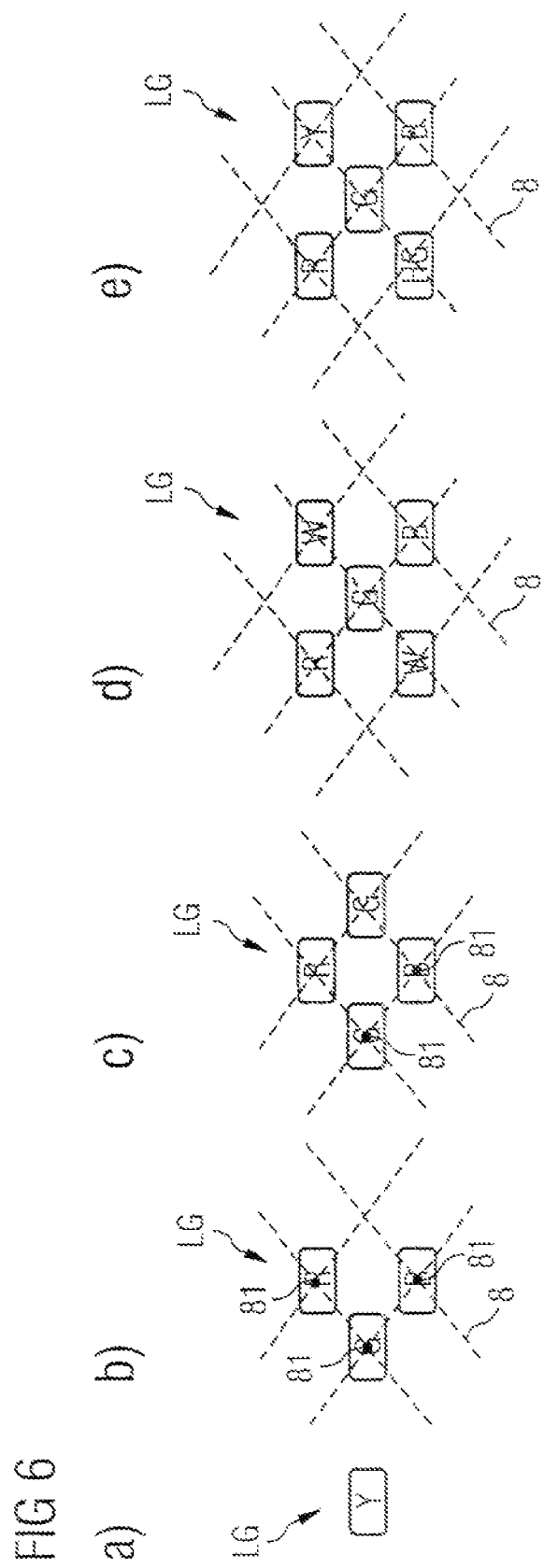
FIGS. 6A to 6E are schematic representations of light source groups according to five different embodiments.

FIG. 6 shows, in Subfigs. A to E, different embodiments of a light source group LG, for example of the kind that can be used in the illumination devices according to FIGS. 1A, 1B, 2A, 2B, and 3, and the grid structure according to FIG. 5.

The light source group LG according to the exemplary embodiment of FIG. 6A comprises a single light source Y, for example an LED, that emits light in the yellow region of the spectrum. It is also conceivable for this light source to be an LED that emits white light, Such an LED can, for example, contain conversion materials that convert the radiation from the semiconductor body of me LED at least partially into light of another wavelength, so that white light is generated. Thus, the semiconductor body of the LED can emit, for example, blue light, which is partially converted by means of conversion materials into yellow light so that the LED emits white light. LEDs comprising conversion materials are described, for example, in the documents WO 97/50132 and WO 98/12757, whose disclosure content in this regard is hereby incorporated by reference.

In the case of the light source group LG according to the exemplary embodiment of FIG. 6B, a red R, a green G and a blue B LED are additionally combined to form each of said light source groups LGs, which are arranged on the grid points 81 of a second regular grid 8 having a hexagonal grid structure.

The light source group LG according to FIG. 6C, in contrast to the light source group LG of FIG. 6B, comprises an additional green LED G, which occupies a further grid point 81 of the second regular grid 8, having a hexagonal grid structure.

In the case of the light source group LG according to FIG. 6D, a red R, a green G and a blue B LED and two white LEDs W are combined to form a light source group LG. These light sources R, G, B are also arranged on a second hexagonal grid 8, with the red R, the green G and the blue B LEDs arranged on a common straight line and the two white LEDs W occupying the grid locations 81 of the second grid 8 that are adjacent the red R and the blue B LED, respectively.

The light source group LG according to FIG. 6E also comprises a red R, a green G and a blue B LED arranged on a common straight line of a second regular grid 8 having a hexagonal grid structure. In contrast to the light source group LG according to FIG. 6D, grid locations 81 of the second grid 8 that are adjacent the red R and the blue B LEDs are occupied by a yellow LED Y and a light-green LED HG.[3] This makes it possible to create another color impression than that obtained, for example, with the LEDs according to FIG. 6D.

FIGS. 7A to 7C illustrate, by way of example, grids 3, 8 having different grid structures, which can be used for example as the first and/or second grid 3, 8. FIG. 7A shows a rectangular grid structure, while FIG. 7B depicts a grid, structure in the manner of a parallelogram mid FIG. 7C a hexagonal grid structure.

The invention is not limited to the exemplary embodiments by the description of it with reference thereto. Rather, the invention encompasses any novel feature and any combination of features, including in particular any combination of features recited in the claims, even if that feature or combination itself is not explicitly mentioned in the claims or exemplary embodiments.

The invention claimed is:
1. An illumination device comprising a radiation-emitting front side and a multiplicity of light sources divided into light source groups, wherein said light source groups are arranged on grid point positions of a first regular grid defined on the illumination device,
wherein at least some of said light source groups located in corner regions of said first grid are arranged such that each of the at least some of the light source groups is rotated by an angle related to other of said light source groups located in inner regions of said first grid, and
wherein the angle is approximately equal to 45 degrees.

2. The illumination device as in claim 1, wherein focal points of said light source groups are arranged on the grid point positions of said first grid.

3. The illumination device as in claim 1, wherein respective light sources of any of said light source groups are arranged on a common carrier.

4. The illumination device as in claim 1, wherein said first regular grid has a grid structure that is configured as one of: a hexagonal structure, a rhombic structure, a rectangular structure, a square structure and a parallelogram structure.

5. The illumination device as in claim 1, wherein respective light sources of at least one of said light source groups are arranged on the grid point positions of a second regular grid defined in the illumination device.

6. The illumination device as in claim 1, wherein said second regular grid has a grid structure that is configured as one of: a hexagonal structure, a rhombic structure, a rectangular structure, a square structure and a parallelogram structure.

7. The illumination device as in claim 5, wherein said first regular grid and said second regular grid have the same grid structure.

8. The illumination device as in claim 1, wherein the multiplicity of light sources of said light source groups comprises light sources of at least two different colors.

9. The illumination device as in claim 1, wherein at least one of said light source groups comprises a red (R) light source, a green (G) light source and a blue (B) light source.

10. The illumination device as in claim 1, which emits, from said radiation-emitting front side, mixed-color light having a color locus in the white region of the CIE standard chromaticity diagram.

11. The illumination device as in claim 1, wherein said multiplicity of light sources includes one or more of: an organic light-emitting diode, a semiconductor light-emitting diode and a laser diode.

12. The illumination device as in claim 1, wherein at least some of the light source groups located in an inner region of said first regular grid are arranged similarly to one another.

13. The illumination device as in claim 1, wherein at least some of said light source groups located in edge regions of said first grid are arranged such that each of the at least some of the light source groups is rotated by an angle $\alpha$ relative to other of said light source groups located in inner regions of said first grid.

14. The illumination device as in claim 13, wherein the angle $\alpha$ is approximately equal to 90°.

15. The illumination device as in claim 8, wherein the said light source groups closest to the edge are arranged such that a periodic sequence of different-colored light sources is obtained by tracking across said light source groups along a particular direction defined by a line.

16. The illumination device as in claim 1, wherein the distance between said light sources and said radiation-emitting front side is between 10 mm and 100 mm, limits included.

* * * * *

UNITED STATES PATENT AND TRADEMARK OFFICE
CERTIFICATE OF CORRECTION

PATENT NO.        : 7,878,681 B2
APPLICATION NO.   : 11/814191
DATED             : February 1, 2011
INVENTOR(S)       : Simon Blümel et al.

It is certified that error appears in the above-identified patent and that said Letters Patent is hereby corrected as shown below:

First page, Assignee (73), column 1, line 1, delete "Semiconductor" and insert -- Semiconductors --.

Signed and Sealed this
Twenty-second Day of March, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,878,681 B2 | Page 1 of 1 |
| APPLICATION NO. | : 11/814191 | |
| DATED | : February 1, 2011 | |
| INVENTOR(S) | : Simon Blümel et al. | |

It is certified that error appears in the above-identified patent and that said Letters Patent is hereby corrected as shown below:

First page, Inventors (75), line 2, delete "Abbach" and insert -- Bad Abbach --.

Page 2, Other Publications, column 2, line 3, delete "Ludvig" and insert -- Ludwig --.

Page 2, Other Publications, column 2, line 3, delete "Backlignting" and insert -- Backlighting --.

Signed and Sealed this
Twenty-sixth Day of April, 2011

David J. Kappos
*Director of the United States Patent and Trademark Office*